United States Patent
Molander et al.

(10) Patent No.: US 11,977,875 B2
(45) Date of Patent: May 7, 2024

(54) UPDATE MANAGEMENT SYSTEM AND METHOD

(71) Applicant: LENOVO (SINGAPORE) PTE. LTD, New Tech Park (SG)

(72) Inventors: Mark Edward Molander, Cary, NC (US); Andrew James Palay, Chapel Hill, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 152 days.

(21) Appl. No.: 17/652,808

(22) Filed: Feb. 28, 2022

(65) Prior Publication Data

US 2023/0273783 A1 Aug. 31, 2023

(51) Int. Cl.
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
None
See application file for complete search history.

(56) References Cited

U.S. PATENT DOCUMENTS

| | | | |
|---|---|---|---|
| 7,360,208 B2 * | 4/2008 | Joshi | H04L 67/34 714/E11.207 |
| 11,762,649 B2 * | 9/2023 | Liao | G06N 3/08 717/168 |
| 2007/0300215 A1 * | 12/2007 | Bardsley | G06F 11/3409 717/168 |
| 2018/0203684 A1 * | 7/2018 | Shuvali | G06F 8/65 |
| 2020/0036603 A1 * | 1/2020 | Nieves | H04L 47/83 |
| 2022/0197770 A1 * | 6/2022 | Tan | G06F 8/65 |
| 2022/0382573 A1 * | 12/2022 | Liu | G06F 9/45558 |
| 2023/0028708 A1 * | 1/2023 | Basel | G06N 20/00 |

* cited by examiner

*Primary Examiner* — Marina Lee
(74) *Attorney, Agent, or Firm* — Dean D. Small; The Small Patent Law Group, LLC

(57) ABSTRACT

An update management system includes one or more processors that obtain collective data compiled from a group of computer devices that run an updated version of a software program. The collective data includes at least one of usage data of the computer devices in the group or user feedback directed to operation of the updated version of the software program. The one or more processors determine, based at least on an analysis of the collective data, that the updated version of the software program should be installed on a first computer device controlled by a first user, and generate a control signal to at least one of notify the first user that the updated version is recommended, schedule installation of the updated version, or automatically install the updated version on the first computer device.

20 Claims, 4 Drawing Sheets

UPDATE MANAGEMENT SYSTEM AND METHOD

FIELD

The present disclosure relates generally to software updates on computer devices.

BACKGROUND OF THE INVENTION

Many computer programs receive periodic updates over time. An update may provide various benefits, such as introducing new and/or enhanced features, strengthening security, and improving operating performance and efficiency. Furthermore, some computer devices may be updated to increase homogeneity with other computer devices for smooth interactions among the computer devices. For example, the software on a first computer device may be updated to match the same version (e.g., block or iteration) of the software operating on other computer devices that interact with the first computer device.

The process of developing and rolling out program updates is time-consuming, complex, difficult, and may frustrate some users affected by the update. From the company side that designs the updates, each update may include dozens of sub-tasks and require a significant amount of time from system administrators. As a result of the complexity, companies may not update programs as frequently as recommended or desired. From the user side, an update may require the full attention and faculties of the computer device during the time that the update is downloaded and installed, representing a forced downtime during which the user cannot utilize the computer device. Failure is another risk associated with performing program updates. An updated version of a software program may fail for various reasons, and the remedy may involve performing maintenance on the computer device or simply removing (e.g., rolling back) the updated version to return to the previous version. Rollbacks are costly, time-consuming, frustrating, and even embarrassing. Even if an update is successful, some users may not appreciate the improvements provided by an update, particularly if the improvements do not involve user-facing features of the program. Such users may question whether the update was worthwhile, considering the costs of the update (e.g., forced downtime, memory usage, risk of failure, etc.) versus the alleged benefits. Such users may experience regret, at least initially, after the update due to unfamiliarity with changes in the software program, particularly changes made to user interface and other user-facing features.

Because of these competing interests, it is difficult for personnel responsible for implementing software updates, such as systems administrators, to determine when and/or how frequently to push software updates. A need remains for making the software update recommendation process more automated, informed, consistent, and reliable.

SUMMARY

In accordance with an embodiment, an update management system is provided that includes a memory and one or more processors operably connected to the memory. The memory is configured to store program instructions, which are executable by the one or more processors to obtain collective data compiled from a group of computer devices that run an updated version of a software program. The collective data includes at least one of usage data of the computer devices in the group or user feedback directed to operation of the updated version of the software program. The program instructions are executable by the one or more processors to determine, based at least on an analysis of the collective data, that the updated version of the software program should be installed on a first computer device controlled by a first user, and to generate a control signal to at least one of notify the first user that installation of the updated version is recommended for the first computer device, schedule the installation of the updated version for the first computer device, or automatically install the updated version on the first computer device.

Optionally, the collective data includes both the usage data of the at least some of the computer devices in the group and the user feedback. The collective data may include the user feedback, and the user feedback may be indicative of a performance parameter including at least one of ratings or reviews of the updated version of the software program. The user feedback may be provided by users that control at least some of the computer devices in the group. The one or more processors may obtain at least some of the user feedback from posts submitted, via the Internet, by users that control at least some of the computer devices in the group. The usage data of the collective data may include one or more of performance parameters of the computer devices that run the updated version of the software program, failure events of the computer devices that run the updated version, or penetration data indicative of a prevalence of the updated version of the software program within a community of computer devices broader than the group.

Optionally, the software program includes firmware, and the first computer device and at least some of the computer devices in the group are servers.

Optionally, the one or more processors further execute the program instructions to obtain single user data that is specific to the first user. The one or more processors may determine that the updated version of the software program should be installed on the first computer device based on both the analysis of the collective data and an analysis of the single user data. The single user data may include at least one of user preference settings selected by the first user or usage data of the first computer device while operating a previous version of the software program, different from the updated version.

Optionally, the one or more processors execute the program instructions to analyze the collective data by assigning point values to different elements of the collective data and compiling the point values to produce a score associated with the updated version of the software program. The one or more processors may determine that the updated version of the software program should be installed on the first computer device based on the score. The one or more processors may determine that the updated version of the software program should be installed on the first computer device in response to the score being within a first designated range. The one or more processors may determine that the updated version of the software program should not be installed on the first computer device in response to the score being within a second designated range that is discrete from the first designated range. The one or more processors may determine that the updated version of the software program should be installed on the first computer device within a first period of time in response to the score being within a first portion of the first designated range, and that the updated version of the software program should be installed on the first computer device within a different, second period of time in response to the score being within a second portion of the first designated range.

Optionally, the one or more processors execute the program instructions to analyze the collective data by inputting the collective data into an artificial neural network trained to generate, as an output, a recommendation as to whether or not the updated version of the software program should be installed on the first computer device.

In accordance with an embodiment, a method is provided that includes obtaining, via one or more processors, collective data compiled from a group of computer devices that run an updated version of a software program. The collective data includes at least one of usage data of the computer devices in the group or user feedback directed to operation of the updated version of the software program. The method includes determining, based at least on an analysis of the collective data, that the updated version of the software program should be installed on a first computer device controlled by a first user. The method includes generating a control signal to at least one of notify the first user that installation of the updated version is recommended for the first computer device, schedule the installation of the updated version for the first computer device, or automatically install the updated version on the first computer device.

Optionally, the method may include obtaining single user data that is specific to the first user. The single user data may include at least one of user preference settings selected by the first user or usage data of the first computer device while operating a previous version of the software program. Determining that the updated version of the software program should be installed on the first computer device may be based on both the analysis of the collective data and an analysis of the single user data.

The collective data may include the user feedback indicative of at least one of ratings or reviews of the updated version of the software program. The user feedback may be independently generated and submitted by a plurality of different users that control the computer devices in the group. The user feedback from each of the plurality of different users may be based on an observation of the operation of the updated system by the respective user that generates the user feedback.

Optionally, the method may include analyzing the collective data by inputting the collective data into an artificial neural network trained to generate, as an output, a recommendation as to whether or not the updated version of the software program should be installed on the first computer device. The determining step may be based on the recommendation of the artificial neural network.

Optionally, the method includes assigning point values to different elements of the collective data, and compiling the point values to produce a score associated with the updated version of the software program. The determining step may be based on a comparison of the score to one or more designated ranges.

In accordance with an embodiment, a computer program product having a non-transitory computer readable storage medium is provided. The non-transitory computer readable storage medium includes computer executable code configured to be executed by one or more processors to obtain collective data compiled from a group of computer devices that run an updated version of a software program. The collective data includes at least one of usage data of the computer devices in the group or user feedback directed to operation of the updated version of the software program. The computer executable code is configured to be executed by the one or more processors to determine, based at least on an analysis of the collective data, that the updated version of the software program should be installed on a first computer device controlled by a first user. The computer executable code is configured to be executed by the one or more processors to generate a control signal to at least one of notify the first user that installation of the updated version is recommended for the first computer device, schedule the installation of the updated version for the first computer device, or automatically install the updated version on the first computer device.

Optionally, the computer executable code may be executed by the one or more processors to obtain single user data that is specific to the first user. The one or more processors may determine that the updated version of the software program should be installed on the first computer device based on both the analysis of the collective data and an analysis of the single user data. Optionally, the computer executable code may be executed by the one or more processors to analyze the collective data by assigning values to different elements of the collective data and compiling the values to produce a score associated with the updated version of the software program. The one or more processors may determine that the updated version of the software program should be installed on the first computer device based on the score.

DETAILED DESCRIPTION

Figure 1:
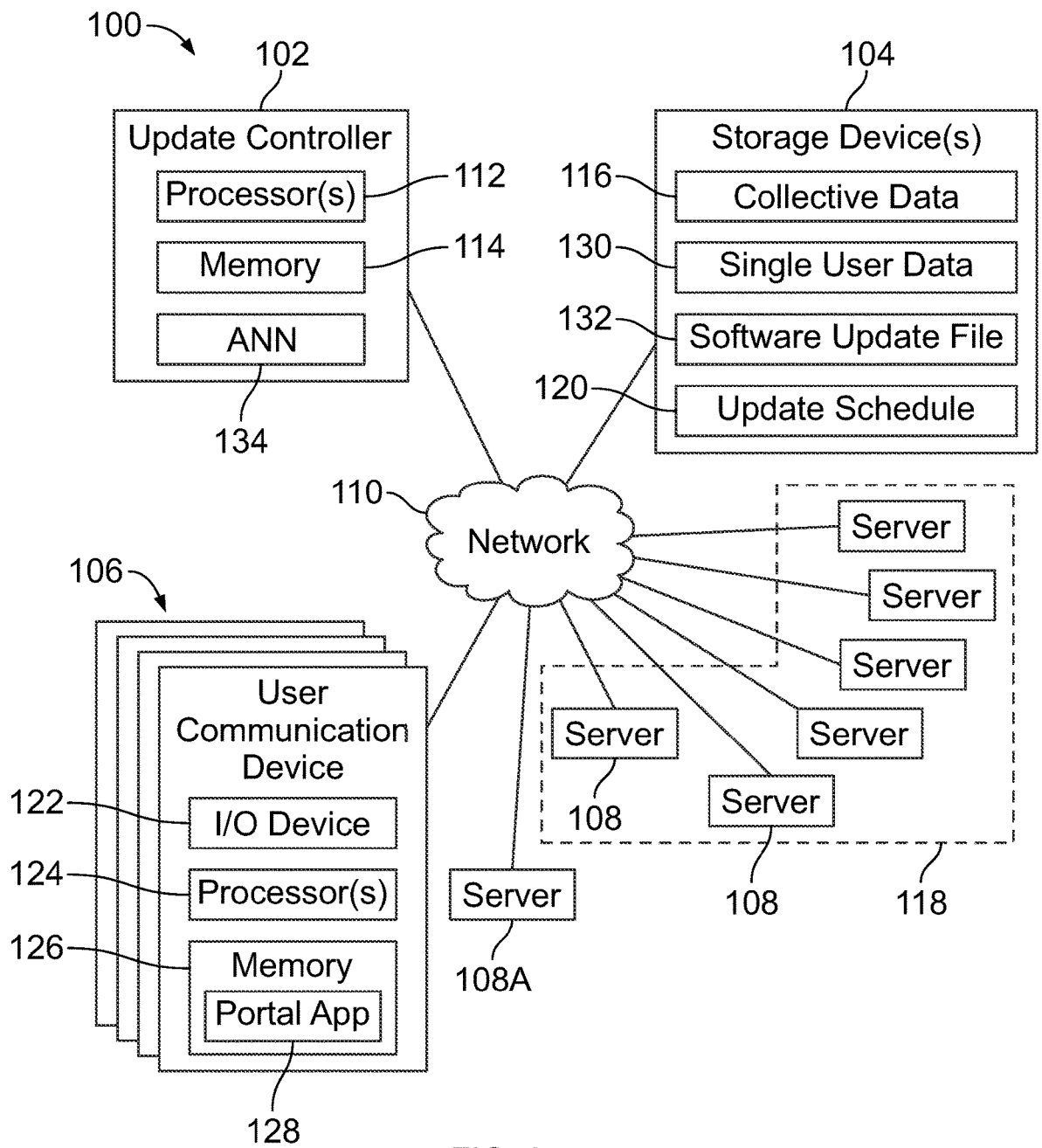
FIG. 1 is a block diagram of an update management system according to an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Embodiments described herein disclose an update management system that determines if and when to update a software program on a user computer device. The update management system remedies known issues with periodic updates by collecting information from a broader variety of sources, relative to pre-existing procedures, and using that information to inform the decision-making process. The broader variety of sources includes external sources outside of (e.g., unaffiliated with) the specific user entity that controls the user computing device and the specific entity that produces the updates. The external sources may include a group of users that already has experience with a particular update. Such users in the group may actively volunteer feedback about their experiences with the update, in the form of ratings and/or reviews. The system may also collect usage data and failure events from the group of users that are automatically monitored from the computer devices of the users. The update management system analyzes the data volunteered and monitored data of the group of users for heuristics, such as to get a sense of how well the update is working for the group. The system may determine whether or not to recommend a particular update to a specific user, and if so how soon to perform the update process, based at least in part on the heuristics from the broad group of users.

The update management system may also consider individual user circumstances in the determination of whether to perform a particular update on a user computer device. Different users may have different tolerances and affinities for updates. For example, some users may be interested in receiving frequent updates to experience fresh new features and/or have the most up-to-date security measures in place. Other users may prefer waiting for a period of time after an update is available before installing the update to ensure that the updated software is tested and reliable and reduce the amount and frequency of forced downtime of the computer device. The update management system may factor individual user circumstances (such as user preferences and usage data), along with the experiences from the external group of users, in the determination of whether and when to recommend that a particular user performs a software update.

Upon determining that an update is recommended for a particular user, the update management system automatically takes one or more actions to achieve installation of the update on the user's computer device. The actions may be fully automated to automatically install the update or partially automated to guide the installation by interacting with the user. The particular actions that are taken by the system may be based on user-selected settings, a determined urgency characteristic of the update, and/or the like. For example, the update management system may automatically commence installation of the update, optionally providing a prior notification to the user to alert the user that the update process will begin. In another example, the system may automatically schedule installation of the update at a future time and may generate a notification to the user to inform the user of the scheduled time. The system in another example may generate a notification that informs the user that the update is recommended and prompt the user to schedule the update.

As used herein, the terms "software program", "software", and "program" are interchangeable and shall mean a set of instructions programmed on a hardware device, such as a computer device. The instructions are executable by the hardware device to perform a function. These terms "software program" and "software" encompass different classes of software, such as embedded server firmware, component firmware, component drivers, operating systems, and applications. Firmware provides low-level control for the corresponding device to interact with other computer hardware. A specific software program may have different versions over time.

A "version" of software as used herein shall mean a specific block or iteration of the software. Installing an update switches to a different version of the software. For example, an initial version of a program may be an A block; a first update installs a B block (e.g., second version) of the program to replace the A block; and a second update installs a C block (e.g., third version) of the program to replace the B block. The "update" or "updated version" refers to software that includes modifications to enhance and improve operation of the software relative to a "previous version" of the software. For example, the updated version may correct software bugs and errors, add new features, patch security flaws, improve performance and/or reliability, and/or the like. The updated version may include simple software updates and/or significant software upgrades over the previous version.

References herein to "computer device", unless specified, shall mean any of various types of hardware devices that perform processing operations, such as servers, computer workstations, personal computers (e.g., laptop, desktop, tablet, smart phone, wearable computer, etc.), and the like.

References herein to "machine learning" shall mean artificial intelligence (AI) algorithms that learn from various automatic or manual feedback, such as observations and/or data. The AI algorithms may be adjusted over multiple iterations based on the observations and/or data. For example, the AI algorithms may be adjusted by supervised learning, unsupervised learning, and/or reinforcement learning (e.g., customer feedback). Non-limiting examples of AI algorithms include decision trees, K-means, deep learning, artificial neural networks, and/or the like.

FIG. 1 is a block diagram of an update management system 100 according to an embodiment. The update management system 100 includes an update controller 102 that performs some or all of the update management operations described herein to determine whether an updated version of a software program should be installed on a first computer device, and to guide the installation of the updated version if such installation is recommended. The update controller 102 is communicatively connected to other components of the update management system 100, which include one or more remote storage devices 104, user communication devices 106, and computer devices 108. The computer devices 108 are shown in FIG. 1 as servers, but may be other types of computer devices 108 in other embodiments. The update controller 102 may be communicatively connected to the other components via a network 110. The network 110 may be the Internet, a local area network (LAN), or the like. The components in the network 110 may be communicatively connected to each other via wired and/or wireless communication links to permit the transmission of information in the form of signals.

The update controller 102 represents hardware circuitry that includes and/or is connected with one or more processors 112 (e.g., one or more microprocessors, integrated circuits, microcontrollers, field programmable gate arrays, etc.). The update controller 102 includes and/or is connected with a tangible and non-transitory computer-readable storage medium, referred to herein as memory 114. The memory 114 may store programmed instructions (e.g., software) that are executed by the one or more processors 112 to perform the update management operations described herein. For example, the programmed instructions may include an algorithm utilized by the one or more processors 112 to analyze obtained information and determine whether at least one computer device 108 should install an updated version of software based on the analysis. The programmed instructions may also dictate responsive actions to be performed by the one or more processors 112 based on the determination of whether the computer device(s) 108 should be updated. The memory 114 may store additional applications, such as various application program interfaces (APIs) that link to cloud hosting services for accessing information from the remote storage devices.

In an embodiment, the update controller 102 obtains collective data 116 from a group 118 of computer devices 108 that run a common version of a software program. For example, the group 118 of computer devices 108 may be a collection of servers that have the same version of firmware. At least some of the computer devices 108 in the group 118 may be controlled by different entities, referred to as users. The users may be companies, government organizations, educational institutions, individual persons, or the like. A user may control a computer device 108 by owning the computer device 108, renting the computer device 108, and/or managing the operations of the computer device 108. At least some of the computer devices 108 in the group 118 may be located at different locations, such as data centers in different states or countries.

One of the computer devices 108A in FIG. 1, referred to herein as a first computer device 108A, does not run the same version of the software program as the computer devices 108 in the group 118. For example, the first computer device 108A may run a previous or earlier version of the software program relative to the computer devices 108 in the group 118, which run a newer version of the software program. The newer version is referred to as an updated version. The update controller 102 may operate as described herein to determine if the updated version of the software program should be installed on the first computer device 108A. The first computer device 108A may represent one of a collection of computer devices (not shown) that run the earlier, outdated version of the software. The updated determination process described herein may be extended to determine if other computer devices in that collection, in addition to the first computer device 108A, should be updated.

If the update controller 102 determines that the first computer device 108A should be updated, then the update controller 102 takes one or more actions to at least initiate (e.g., plan) the update installation process. The actions may include notifying a user via a corresponding one of the user communication devices 106 that installation of the updated version is recommended for the first computer device 108A, scheduling the installation on an update schedule 120, prompting the user via the corresponding user communication device 106 to select a time for the installation, and/or automatically implementing the installation of the updated version onto the first computer device 108A. The update controller 102 may automatically implement the installation by controlling the first computer device 108A to download and install the updated version.

The user computing devices 106 are devices that enable users (e.g., humans) to interact with the update management system 100. The users that interact with the update management system 100, via corresponding user computing devices 106, may include the first user that controls the first computer device 108A, the users that control the computer devices 108 in the group 118 that runs the updated version of the software, and the like. Example user computer devices 106 may include smartphones, tablet computers, laptop computers, hands-free digital assistant devices, desktop computers, wearable computers, and/or the like. The user computing devices 106 may include an input and output (I/O) device 122, one or more processors 124, and a tangible and non-transitory computer-readable storage medium, referred to herein as memory 126. These components may be commonly held within or on a housing or case of the respective user computing device 106. Each user computing device 106 may have additional components that are not shown in FIG. 1, such as communication circuitry for communicating with the update controller 102 through the network 110. The I/O device 122 may include one or more devices for providing user inputs, such as a touch screen, a touchpad, a keyboard, buttons, a dial, a microphone, and the like.

A user may use the I/O device 122 to generate user inputs that are conveyed to the update controller 102 and/or the remote storage devices 104. The user may generate a user input to, for example, indicate user consent with an update installation, select a time for an update installation, provide user feedback related to a version of software, or the like. The I/O device 122 may include one or more devices for providing information to the user, such as a display screen, an audio speaker, and the like. The one or more processors 124 may include one or more microprocessors, integrated circuits, microcontrollers, field programmable gate arrays, and/or the like. The memory 126 may store programmed instructions (e.g., software) that are executed by the one or more processors 124 to perform tasks described herein, such as presentation of notifications on the display screen of the I/O device 122 to alert a user.

In an embodiment, the memory 126 of the user communication device 106 may store a portal application 128 which is specific to the update management system 100. For example, a user may selectively activate or "open" the portal application 128 on the user computing device 106 in order to interact with the update management system 100 (e.g., the update controller 102). The portal application 128 may include a graphical user interface (GUI) that is displayed on the display screen when the portal application 128 is active. The GUI may provide update-specific notifications to the user and enable the user to submit user inputs. For example, a user that controls one or more of the computer devices 108 in the group 118 may utilize the portal application 128 to volunteer user feedback directed to the updated version of the software program. The user feedback may be in the form of a review of the update version and/or a ranking (e.g., number of stars out of five or ten maximum starts) of the updated version. The user feedback that is submitted may be uploaded from the user communication device 106 to the one or more remote storage devices 104 via the network 110. The submitted user feedback is then stored in the collective data file 116 or database in the remote storage device(s) 104.

The one or more remote storage devices 104 may provide cloud-based data storage of information that is used by the update controller 102 for managing updates. For example, the update controller 102 may communicate with the remote storage device(s) 104 to perform the update management operations described herein. The remote storage devices 104 may be servers that are located at data centers. Although not shown, the remote storage devices 104 may include one or more processors, a tangible and non-transitory computer-readable storage medium (e.g., memory), communication circuitry, and the like. The remote storage devices 104 are depicted in FIG. 1 as discrete and separate from the update controller 102, but may be integrated with the update controller 102 in a common computing device in an alternative embodiment. Allocating resources of the update management system 100 at the remote storage device(s) 104 may enable efficient aggregation and analysis of information collected from multiple different users and multiple different computer devices 108, which benefits the update management system 100.

The remote storage device(s) 104 may include a software update file 132 that includes one or more versions of software. For example, the software update file 132 may include the updated version of the software program, which is the version run by the group 118 of computer devices 108. Once the updated version of the software is completed, the updated version may be stored in the update file 132 to be accessed for dissemination to different computer devices 108. If it is determined that the first computer device 108 should install the update, the update controller 102 may retrieve the updated version from the file 132 and communicate the updated version to the first computer device 108 via the network 110. As used herein, "retrieval" of information from a storage device may include generating a temporary copy of the information such that the original information is not removed from the storage device or otherwise modified.

The remote storage device(s) 104 may also include an update schedule 120 that schedules the installation of updates to different computer devices. The update controller 102 may consult the update schedule 120 to determine, for example, when to retrieve the updated version of the software program and communicate the updated version to the first computer device 108A.

The remote storage device(s) 104 include a collective data file 116 that stores information (e.g., collective data) compiled from the group 118 of computer devices 108 that run the updated version of the software program. The update controller 102 obtains the collective data from the collective data file 116 and analyzes the collective data to determine whether or not the first computer device 108A should install the updated version. The collective data may include usage data of the computer devices 108 in the group 118 and/or user feedback submitted by users that control at least some of the computer devices 108 in the group 118. The usage data refers to the use of the updated version of the software program. The usage data is information that is transmitted from the computer devices 108 to the remote storage device(s) 104 via the network 110. For example, a controller of a computer device 108 in the group 118 may periodically, or on request, transmit a status update containing usage data to the remote storage device(s) 104. The usage data may be collected from multiple different computer devices 108 in the group 118 without requiring user interaction. For example, the status updates may be automatically generated and communicated from the computer devices 108 without user input or participation.

The usage data in the collective data file 116 may include performance parameters of the computer devices 108 that run the updated version of the software, information about failure (e.g., fault) events experienced by the computer devices 108 that run the updated version, and/or penetration data. At least some of the performance parameters may be monitored by sensors in the computer devices 108. For example, the performance parameters may include a temperature of the computer device 108 when operating, an amount of electrical power that the computer device 108 consumes, an amount of electrical power consumed by a cooling system that actively dissipates heat from the computer device 108, statistics related to processing speeds, memory usage, and the like. The performance parameters can indicate how the updated version of the software affects the operating efficiency and utility of the corresponding computer device 108 that run the updated version. The performance parameters in the collective data file 116 may also include performance parameters generated prior to installing the updated version of the software. The performance parameters from before the update can be compared to the performance parameters generated after the update to determine how running the updated version affects the computer devices relative to running the earlier version.

The failure events in the collective data file 116 may include a record of problems related (or possibly related) to the updated version of the software, as experienced by the computer devices 108 in the group 118. The failure events can include failed attempts to install the updated version of the software program, instances in which the software program crashed and/or required a restart, errors made by the updated version of the software program, and the like. The failure events may be automatically transmitted to the remote storage device(s) 104 from the computer devices 108, similar to the performance data. For example, the update messages from the computer devices 108 may include both the performance data and failure events. Higher numbers of failure events compiled from the computer devices 108 in the group 118 suggest that the updated version may be unreliable, which may reduce the likelihood of recommending that the first computer device 108A installs the updated version. Lower numbers of failure events suggest that the updated version is reliable, which may increase the likelihood of recommending that the first computer device 108A installs the updated version. The failure events may identify the type of failure or fault, and may also provide additional information about the failure event, such as a severity of the failure.

The penetration data in the collective data file 116 may be indicative of the prevalence of the updated version of the software program within a community of computer devices 108 even broader than the group 118. For example, the community includes the group 118 of computer devices 108 that run the updated version, as well as the first computer device 108A and other computer devices 108 that do not run the updated version of the software program. For example, the update controller 102 may keep a running tally of the total number of computer devices 108 in the community that run the updated version of the software program (referred to as variable "X") and the total number of computer devices 108 in the community that run an earlier version of the software program (referred to as variable "Y"). A penetration value may be calculated by dividing the number of computer devices 108 that run the updated version by the total number of computer devices 108 in the community that run versions of the software program (e.g., penetration=X/(X+Y)). The penetration value may be represented by a percentage. A relatively high penetration value indicates that a significant number of the computer devices 108 in the community have the updated version of the software program, which suggests that the updated version has achieved widespread acceptance and usage in the community. The update controller 102 may be more likely to recommend that the first computer device 108A install the updated version if the penetration data indicates widespread acceptance and usage of the updated version.

The user feedback of the collective data is feedback directed to the updated version of the software program, and is provided by users that control at least some of the computer devices 108 in the group 118. The user feedback is directed to operation of the updated version of the software. For example, the feedback may be indicative of a performance parameter of the updated version as perceived by a respective user. The performance parameter can include a rating and/or review. For example, after the computer devices 108 in the group 118 have been operating with the updated version of the software for some time, the users may form opinions about the updated version based on experience with the updated version. The users may volunteer feedback about the updated version by generating reviews and/or ratings of the updated version. The reviews may include opinions, reactions, and observations of the users to the operation of the updated version. For example, the reviews may describe aspects of the updated version of the software that the user likes and/or other aspects that the user dislikes. Some reviews may provide a recommendation about whether or not other people should install the updated version on their computer devices.

The ratings may provide a value for the updated version of the software out of a designated maximum value, which indicates how strongly the user agrees with the prompt. The prompt may be to simply provide a general rating for the updated version out of 5 starts, 10 stars, 100 points, or the like. Optionally, a single user may provide multiple ratings directed to different aspects of the experience with the updated version of the software, such as one rating directed to the performance of the updated version, another rating directed towards the inconvenience of installing and possibly paying for the updated version, and a third rating directed to whether the user would recommend the updated version to others.

The users may submit the feedback by submitting online posts using the Internet. One way that users may submit feedback is through the portal application 128 on the user communication device 106. For example, the portal application 128 may have a virtual button that is selectable by the user via the I/O device 122 to open a specific GUI page or window that enables the user to enter feedback. The feedback page or window may include various prompts to control the topic of the feedback, such as the prompts described above for eliciting multiple ratings. Alternatively, a user may submit feedback by using an Internet browser to visit a webpage of the entity that utilizes the update management system 100, and selecting a virtual button that opens a specific feedback window or webpage. Another option may be for the user to include the feedback in an email to the entity that utilizes the updated management system 100. The entity may forward the emails with user feedback, or just the user feedback portions of the emails, to the update management system 100 and the collective data file 116. Optionally, some users may submit feedback by submitting posts on third party websites using the Internet. For example, the update controller 102, or another processing device of the system 100, may actively mine third party websites, such as social media websites, for posts that address the updated version of the software. The mining may be performed by a web crawler bot. The update controller 102 may be able to filter through large volumes of data by searching for key words, such as the name of the software program and/or an identifier of the updated version of the software program (e.g., name, code name, identification number, etc.). The update controller 102 may copy the content of relevant posts that are discovered, and transmit to the collective data file 116.

The user feedback may be indicative of at least one of ratings or reviews of the updated version of the software program. The user feedback may be independently generated and submitted by a plurality of different users that control the computer devices in the group, such as dozens, hundreds, or even thousands of users. The users may be independent and unrelated. The user feedback from the plurality of users may represent crowdsourcing of opinions directed to the performance of the updated version of the software. The user feedback from each of the plurality of different users may be based on observations, by the respective user that generates the feedback, of operational parameters (e.g., performance parameters) of the updated system operating on one or more computer devices 108 controlled by that user. The collection of users that provide user feedback may be relatively large, relatively open, and evolving. The update controller 102 may analyze the crowdsourced user feedback to identify trends in the data that would be difficult to detect without such a large sample size. For example, the analysis of the feedback from third party users that have experience with the updated version may provide a sense of the overall reception of the update version in the community as positive/beneficial or negative/ineffective. Crowdsourcing feedback on the updated version may also provide insights into which aspects of the updated version are particularly valuable and popular and which aspects should be addressed (e.g., corrected) in a future update. Another benefit of crowdsourcing the user feedback is that it provides an efficient manner of obtaining a large number of ratings and/or reviews from a relatively diverse base of users, without the hassle of attempting to contact the users individually via direct communications.

In an embodiment, the update controller 102 performs an update management method to determine whether or not (at least) the first computer device 108A should install the updated version of the software program. The operations performed by the update controller 102 to carry out the update management method may be based on program instructions stored in the memory 114. The update controller 102 obtains the collective data related to the updated version of the software program. In an embodiment, the update controller 102 obtains at least some of the collective data from the collective data file 116 in the remote storage device(s) 104. Optionally, the update controller 102 may obtain some of the collective data directly from one or more of the computer devices 108 in the group 118. For example, the controller 102 may communicate a status update request to the group 118 via the network 110, and the computer devices 108 may reply with respective status updates that contain the most recent usage data of the computer devices 108. Furthermore, the update controller 102 may actively mine for the most recent user feedback by searching public posts on third party websites, such as social media websites, and searching recent received emails at an email address operated by the entity that utilizes the update management system 100.

The update controller 102 then analyzes the collective data to determine, based on the collective data, whether or not the first computer device 108A should install the updated version of the software program. Analysis of the usage data of the group 118 of computer devices 108 running the updated version provides quantitative information about the efficiency, reliability, and even prevalence of the updated version. Analysis of the user feedback provides qualitative information from users that have first-hand experience with the updated version.

In an embodiment, the update controller 102 may analyze the collective data by inputting the collective data into an AI algorithm, a non-AI algorithm, a computer-based model, or the like that is designed to provide, as an output, a recommendation or indication of whether or not the first computer device 108A should install the updated version of the software program. Such an algorithm or model may assign values (e.g., scores or weights) to different elements of the collected data. The values of some elements may be more heavily weighted than the values of other elements based on identified differences in importance between the elements. The algorithm or model may compile or aggregate the values to determine the output recommendation. Optionally, the one or more processors 112 of the update controller 102 may perform the algorithm itself based on programmed instructions. Alternatively, the one or more processors 112 may input the collective data into a computer-based model or one or more AI processors discrete from the processors 112.

In an embodiment, the update controller 102 may include, or be communicatively connected to, an artificial neural network (ANN) 134. The ANN 134 may receive the collective data and analyze the collective data based on machine learning (e.g., trained relationships) to output the update recommendation for the first computer device 108A. The ANN 134 is trained to generate the update recommendation as an output.

In an embodiment, the update controller 102 may analyze the collective data by assigning values to different elements of the collective data and compiling the values to produce a score associated with the updated version of the software program. The updated controller 102 may determine whether the updated version of the software program should be installed on the first computer device 108A based on the score.

Figure 2:
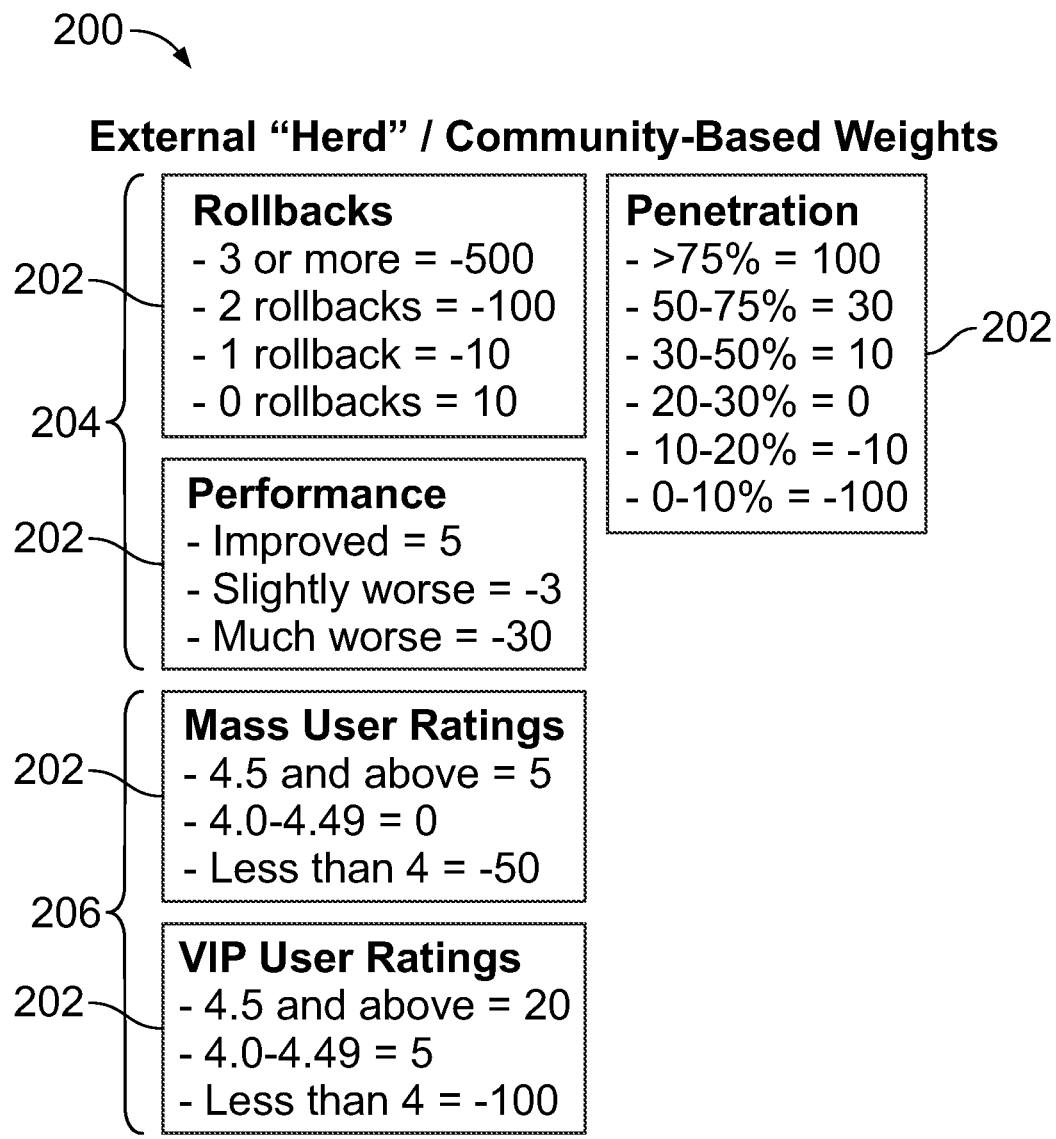
FIG. 2 illustrates a scoring rubric utilized by the update management system for different elements of collective data according to an embodiment.

FIG. 2 illustrates a scoring rubric 200 for different elements 202 of collective data associated with a version of software according to an embodiment. The update controller 102 can use the scoring rubric 200 to assign values to different elements of the collective data related to the updated version of the software program. The rubric 200 may be stored in the memory 114 of the update controller 102. The specific elements 202 and values (e.g., scores) shown in FIG. 2 are provided for descriptive purposes and are not intended to be limiting of the different types of elements and values that can be utilized in other embodiments. The update management system 100 may provide users to the option to modify the values of the elements 202 in the rubric 200, optionally the elements 202 themselves, based on user preferences.

The elements 202 in FIG. 2 are arranged into a usage data category 204 and a user feedback category 206. The elements 202 in the usage data category include Rollbacks, Performance, and Penetration. The Rollbacks element 202 assigns negative values to the occurrence of rollbacks. Each rollback represents an event in which a computer device 108 in the group 118 uninstalled the updated version of the software due to fault, failure, error, dislike, or the like. For example, if two rollbacks have been recorded in the collective data, then that element 202 is scored "−100" points. The Performance element 202 may ask whether the performances of the computer devices 108 that run the updated version have substantially improved, are unchanged or slightly worse, or are substantially worse than before installing the updated version. If the performance is determined to be improved with the updated version, then that element 202 is scored "5" points. The variation in the amount of points assigned by the Rollbacks element 202 compared to the Performance element 202 indicates that the Rollbacks element 202 has a greater weight than the Performance element 202. For example, failure events, such as documented rollbacks, may be more influential than performance data in the determination of whether the first computer device 108A should be updated than the performance data. The Penetration element 202 may assign different values based on the percentage of computer devices in a community that run the updated version of the software program relative to all computer devices in the community that run the software program (e.g., any version thereof). For example, if between 30% and 50% of the computer devices in the community that have the software program run the updated version, then that element 202 is scored "10" points.

The elements 202 in the user feedback category 206 include Mass User Ratings and VIP (e.g., very important person) User Ratings. The ratings in these elements 202 may refer to user feedback ratings submitted by the users that control the computer devices 108 in the group 118. Optionally, the rubric 200 may assign greater weight to the ratings submitted by VIP users than non-VIP users. The VIP users may have a special distinction over the mass, non-VIP users, that is based on their achieved status in the community, membership in a club, a business relationship, or the like. The update controller 102 may calculate the average of the ratings of the updated version submitted by the VIP users. If that average rating is at least 4.5 in a designated rating scale (e.g., out of 6, out of 8, out of 10, or the like), then that element 202 is scored "20" points. The update controller 102 may also calculate the average of the ratings of the updated version submitted by the non-VIP users. If the non-VIP average rating is at least 4.5, then that element 202 is scored "5" points. Although not shown, the rubric 200 may have one or more additional elements that accounts for user reviews that do not have a corresponding rating. For example, the rubric 200 may assign a first certain point value, such as "15" points, for every review that indicates that the user would recommend the updated version of the software to others, and may assign a second point value, such as "−15" points, for every review that indicates that the user would not recommend the updated version. The negative reviews would then cancel out a corresponding number of positive reviews when the points are aggregated.

After determining the point values for the different elements 202 of the collective data based on the rubric 200, the update controller 102 may aggregate (e.g., sum) the point values to produce a score associated with the updated version of the software program. In an embodiment, the updated controller 102 may determine whether or not the updated version of the software program should be installed on the first computer device 108A based on the score. If the score is within a first designated range, the update controller 102 determine that the updated version of the software program should be installed on the first computer device 108A. In the illustrated embodiment, the first designated range may be any number that is at least a designated threshold number. For example, if the designated threshold number is 30 and the aggregated score is determined to be 50, then the update controller 102 determines that the updated version of the software program should be installed on the first computer device 108A. If the score is within a second designated range, which is non-overlapping (e.g., discrete) with the first designated range, the controller 102 may determine that the updated version of the software program should not be installed on the first computer device 108A. For example, the second designated range may be any number that is less than the designated threshold number. If the designated threshold number is 30 and the aggregated score is determined to be −10, then the update controller 102 determines that the updated version of the software program should not be installed on the first computer device 108A. In that case, the update controller 102 may recommend that the first computer device 108A skip the installation of the updated version, at least at the current time.

After determining whether or not the first computer device 108A should install the updated version of the software program, the update controller 102 may take one or more actions. The update controller 102 may take an action by generating a control signal that controls another device and/or is communicated to another device. For example, in response to determining that the first computer device 108A should install the update version, the update controller 102 may generate a control signal to notify the first user that installation of the updated version is recommended for the first computer device 108A. The notification may be provided by a message that is communicated from the controller 102 via the network 110 to the user communication device 106 of the first user. The user communication device 106 may display the message on the GUI of the display screen. Optionally, the message may prompt the first user to schedule the installation of the updated version on the first computer device 108A. The GUI that presents the message may ask the first user to schedule the installation, and may provide options. The options may include installing the update now, selecting a specific time to install the update, selecting to install the update at night, selecting to install the update the next time that the first computer device 108A restarts, or the like.

In another example that is responsive to determining that the update is recommended, the update controller 102 may generate a control signal to schedule the installation of the updated version for the first computer device 108A, without prompting the first user for approval or assistance in scheduling the installation. The update controller 102 may automatically schedule the installation for a certain specific time in the near future or the next time that the next time that the first computer device 108A restarts.

In a third example that is responsive to determining that the update is recommended, the update controller 102 may generate a control signal to automatically install the updated version on the first computer device 108A, without delay and without seeking approval from the first user. Optionally, the update controller 102 may take multiple actions. For example, the controller 102 may notify the first user that the update is recommended and may request that the first user select a time for the installation, as described above. However, the controller 102 may also set a default installation deadline, at which time the first computer device 108A will be automatically controlled to install the updated version unless the updated version has already been installed. The notification to the first user may provide the default installation deadline. As such, the controller 102 may perform all three of the actions of notifying the first user, scheduling the installation, and automatically installing the updated version once the default deadline is reached.

In an embodiment, the responsive actions to the determination may not simply be based on the binary decision of whether or not to update, but may also depend at least in part on characteristics of the determination. The characteristics of the determination may include a determined urgency of the installation. Installation of the updated version may be considered urgent if the analysis indicates that there is a high likelihood of failed operations and/or damage to a component of the first computer device 108A until the installation takes place. If the installation is considered urgent, the controller 102 may take different actions than if the installation is not considered urgent. For example, the controller 102 may automatically install the updated version if it is determined that the installation is urgent. In another example, the type and/or order of actions taken by the update controller 102 may be based on the score relative to the bounds of the first designated range associated with recommending the update. The controller 102 may determine that the updated version of the software program should be installed on the first computer device 108A within a first period of time in response to the score being within a first portion of the first designated range, and that the updated version of the software program should be installed on the first computer device 108A within a different, second period of time in response to the score being within a second portion of the first designated range. For example, the first designated range may be segmented into different non-overlapping portions of the range. A first score that exceeds the designated threshold value by a large margin may indicate a strong recommendation for the installation of the updated version. A second score that is still in the first designated range but is closer to the threshold value than the first score may indicate a weaker recommendation for the installation of the updated version. The controller 102 may suggest that the installation occur soon for stronger recommendations, such as within one week (which represents the first period of time). The controller 102 may be more casual about the installation for weaker recommendations, such as recommending installation within one month (which represents the second period of time). In another example, the controller 102 may automatically schedule the installation for strong recommendations, and may not schedule the installation without input by the user for weaker recommendations.

In an embodiment, the update controller 102 may take one or more different actions in response to response to determining that the first computer device 108A should not install the update version based on the analysis of the collective data. For example, the update controller 102 may generate a control signal to block the installation of the updated version on the first computer device 108A. The control signal may cancel a scheduled installation, for updating the software program of the first computer device 108A, that is stored in the update schedule 120 of the storage device(s) 104. The update controller 102 optionally may notify the first user that installation of the updated version is not recommended for the first computer device 108A. The notification may be presented as a message on the display of the user communication device 106. The message optionally may include one or more reasons for the decision to not install the updated version. In an alternative embodiment, the update controller 102 does not generate a message to notify the first user that the updated version is not recommended. The update controller 102 may simply avoid notifying the first user about the updated version of the software program.

In an embodiment, the update controller 102 may consider specific information about the first user and/or the first computer device 108A in addition to the collective data compiled from the group 118 of computer devices 108 for the update determination regarding the first computer device 108A. The remote storage device(s) 104 may include a single user data file 130 that stores information (e.g., single user data) that is specific to the first user and/or the first computer device 108A. The update controller 102 may obtain and analyze both the collective data and the single user data to make the update determination for the first computer device 108A.

The single user data may include usage data of the first computer device 108A while operating the version of the software program that is currently on the first computer device 108A. Such version is a different, earlier version than the updated version that is run by the computer devices 108 in the group 118. The usage data may be similar to the usage data of the collective data, except that the usage data is specific to the first computer device 108A. For example, the usage data may include performance parameters, such as operating temperatures of the first computer device 108A, electrical power consumption by the first computer device 108A, statistics related to processing speeds, memory usage, and/or the like. The usage data may also include a record of failure events experienced by the first computer device 108A while operating the software program. The usage data may include general information about the first computer device 108A, such as the type of operating system on the device 108A, an identity of the version of the software program currently installed on the device 108A, the last time that the software program and/or the operating system was updated, whether an update for the operating system is in a queue ready for installation, and/or the like.

Figure 3:
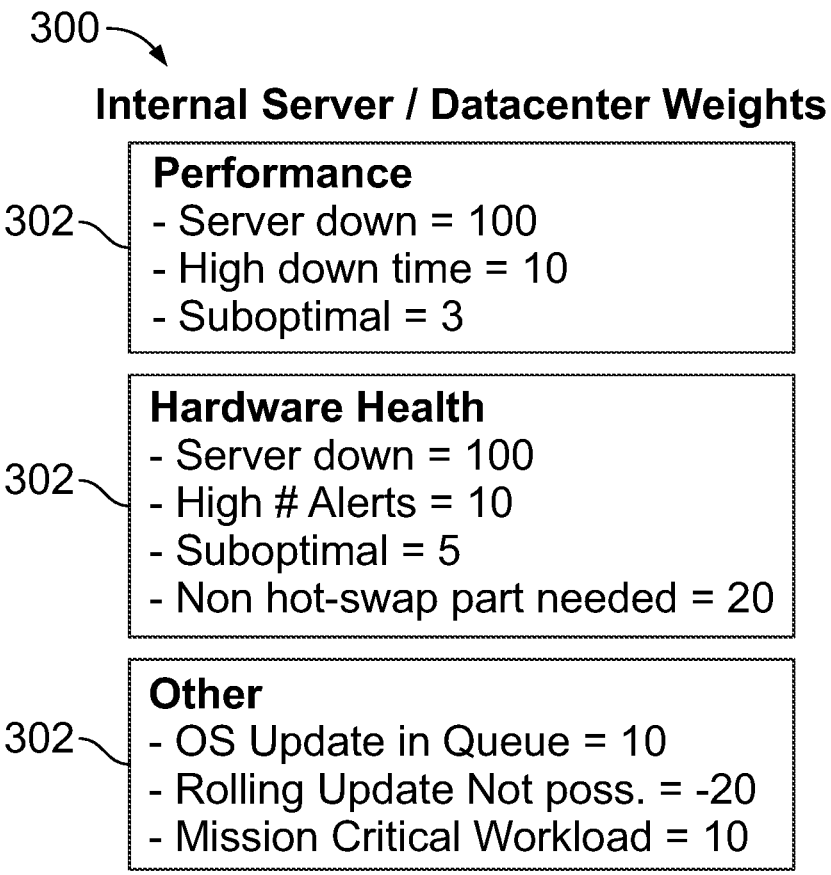
FIG. 3 illustrates a scoring rubric utilized by the update management system for different elements of usage data of a first computer device according to an embodiment.

FIG. 3 illustrates a scoring rubric 300 for different elements 302 of usage data of the first computer device 108A operating the earlier version of the software according to an embodiment. The update controller 102 can use the scoring rubric 300 to assign values to different elements of the usage data corresponding to the earlier version of the software program. The rubric 300 may be stored in the memory 114 of the update controller 102. The specific elements 302 and values (e.g., scores) shown in FIG. 3 are provided for descriptive purposes and are not intended to be limiting of the different types of elements and values that can be utilized in other embodiments. The update management system 100 may provide users to the option to modify the values of the elements 302 in the rubric 300, and optionally the elements 302 themselves, based on user preferences.

In FIG. 3, the elements 302 include Performance, Hardware Health, and Other. In the illustrated embodiment, the first computer device 108A is a server. The Performance element 302 assigns values based on an amount of time or frequency at which the server is down. The Hardware Health element 302 assigns values based on the number of failure-based alerts generated by the first computer device 108A, whether any replacement parts are needed, and server down time. The Other element 302 assigns values based on whether there is an operating system (OS) update in the queue of the first computer device 108A, whether or not a rolling update is possible, and whether the computer device 108A has a workload that is considered to be sensitive and important (e.g., "mission critical").

The update controller 102 may determine the point values for the different elements 302 of the rubric 300 based on the usage data of the first computer device 108A. The update controller 102 may then aggregate the point values from the rubric 300 and add to the aggregated point values from the rubric 200 to produce the score. In this way, the score takes into account external information based on the usage of the updated version and experiences of other users, as well as internal information about the specific computer device 108A on which the updated version may be installed depending on the determination. The updated controller 102 may determine whether or not the updated version of the software program should be installed on the first computer device 108A based on the score, such as by comparing the score to one or more designated ranges as described above. Optionally, instead of assigning point values to different elements of the usage data based on the rubric 300, the update controller 102 may input the usage data into the ANN 134 or another computer-based model. The ANN 134 or other computer-based module may analyze the usage data and output a recommendation whether or not to install the updated version in the first computer device 108A based on the analysis.

In an embodiment, the single user data that is considered by the update controller 102 may include user preference settings selected by the first user that controls the first computer device 108A. Both the user preference settings of the first user and the usage data of the first computer device 108A may be factored in the update determination, in conjunction with the collective data based on the group 118 of computer devices 108 that run the updated version. The first user volunteers the user preference settings. For example, the first user may utilize a corresponding user communication device 106 to input desired user preference settings which are then communicated to the update controller 102 and/or remote storage device(s) 104 via the network 110. A set-up menu in the portal application 128 may provide a list of settings with the ability of the first user to adjust the settings according to preferences of the first user. The update controller 102 may consider the preferences of the first user in the determination of whether or not to update the first computer device 108A to install the updated version. The update controller 102 may also consider the user preferences when determining which responsive action or actions to take after the determination step. For example, the user preference settings may indicate that the first user delegates control of updates to the update controller 102. In that case, upon determining that installation of the updated version is recommended, the update controller 102 may automatically implement the installation of the updated version or may automatically schedule the installation, without requesting approval from the first user.

Figure 4:
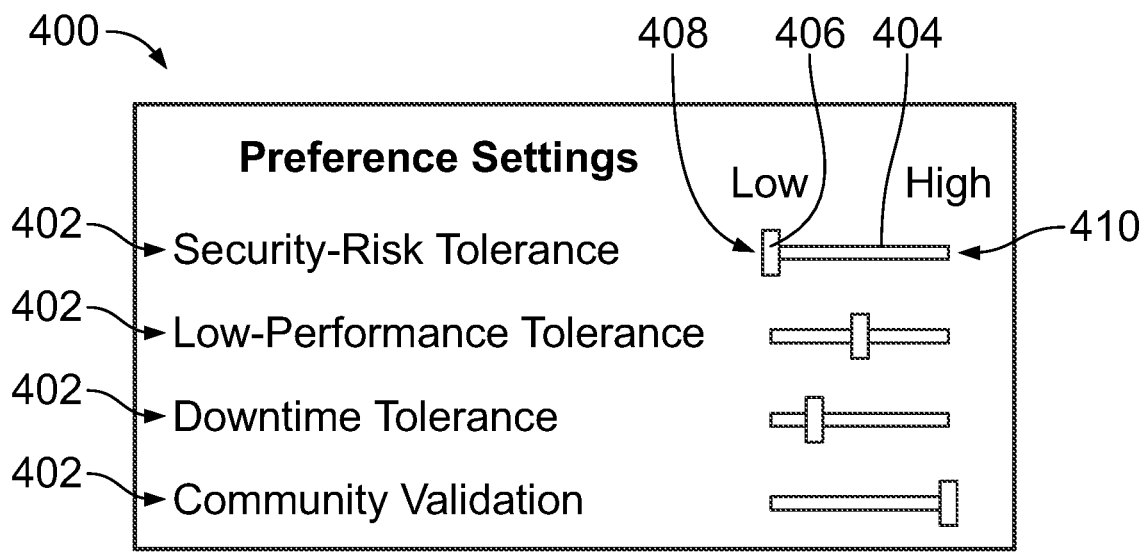
FIG. 4 illustrates a set of user preference settings of the update management system according to an embodiment.

FIG. 4 illustrates a set 400 of user preference settings 402 of the update management system 100 according to an embodiment. The set 400 may be displayed on a GUI of a user communication device 106. The user preference settings 402 shown in FIG. 4 include a security-risk tolerance, a low-performance tolerance, a downtime tolerance, and community validation. Each setting 402 has an associated slider control bar 404 with a marker 406 that is able to be moved by the first user, via the I/O device 122, to various different locations along the length of the slider bar 404 between a first or left end 408 and a second or right end 410. The left ends 408 of the slider bars 402 represent a "Low" state or condition, and the right ends 410 represent a "High" state or condition.

The security-risk tolerance setting 402 indicates how risk-averse the first user is with respect to cybersecurity of the software program. In the illustrated embodiment, the security-risk tolerance setting 402 is set to Low, indicating that the first user has a low tolerance for security risks (e.g., software security is very important to the first user). The low-performance tolerance setting 402 indicates the tolerance of the first user for the first computer device 108A operating with degraded performance. The downtime tolerance setting 402 indicates the tolerance of the first user for the first computer device 108A to be down (e.g., inoperable)

for one or more periods of time, such as a period of time necessary to install the updated version of the software. The community validation setting 402 indicates a level at which the first user is influenced by other users in the community. For example, the High community validation shown in FIG. 4 may indicate that the first user is highly influenced by the collective data associated with the computer devices 108 in the group 118, including the user feedback of the users that control the group 118. If the updated version of the software has high prevalence in the community and/or the user feedback of the users that control the group 118 is generally positive in favor of the updated version, then the update controller 102 may be more likely to recommend installation of the updated version on the first computer device 108A (than if the community validation setting 402 is set to a lower level). The user preference settings utilized by the update management system 100 may include additional settings, fewer settings, and/or different settings than the four illustrated settings in other embodiment.

Optionally, after the first user inputs selected levels of the user preference settings 402 via the I/O device, the update controller 102 may convert the selected levels to values. The values may be point values, similar to the point values shown in the rubrics 200, 300 in FIGS. 2 and 3, respectively. Such point values representing the user preference settings may be aggregated with the point values based on the collective data and the point values based on the usage data of the first computer device 108A to produce the score used to determine whether or not the update is recommended. Alternatively, the values corresponding to the user preference settings 402 may be input into the ANN 134 or another computer-based model which outputs the update recommendation based on the input values.

In a first alternative embodiment, the update controller 102 does not consider any single user data specific to the first user or the first computer device 108A in the update determination. As such, the update controller 102 only considers the collective data based on the group 118 of computer devices 108 that run the updated version. In a second alternative embodiment, only the usage data of the first computer device 108A is analyzed with the collective data for the update determination. In a third alternative embodiment, only the user preference settings selected by the first user is analyzed with the collective data for the update determination.

Figure 5:
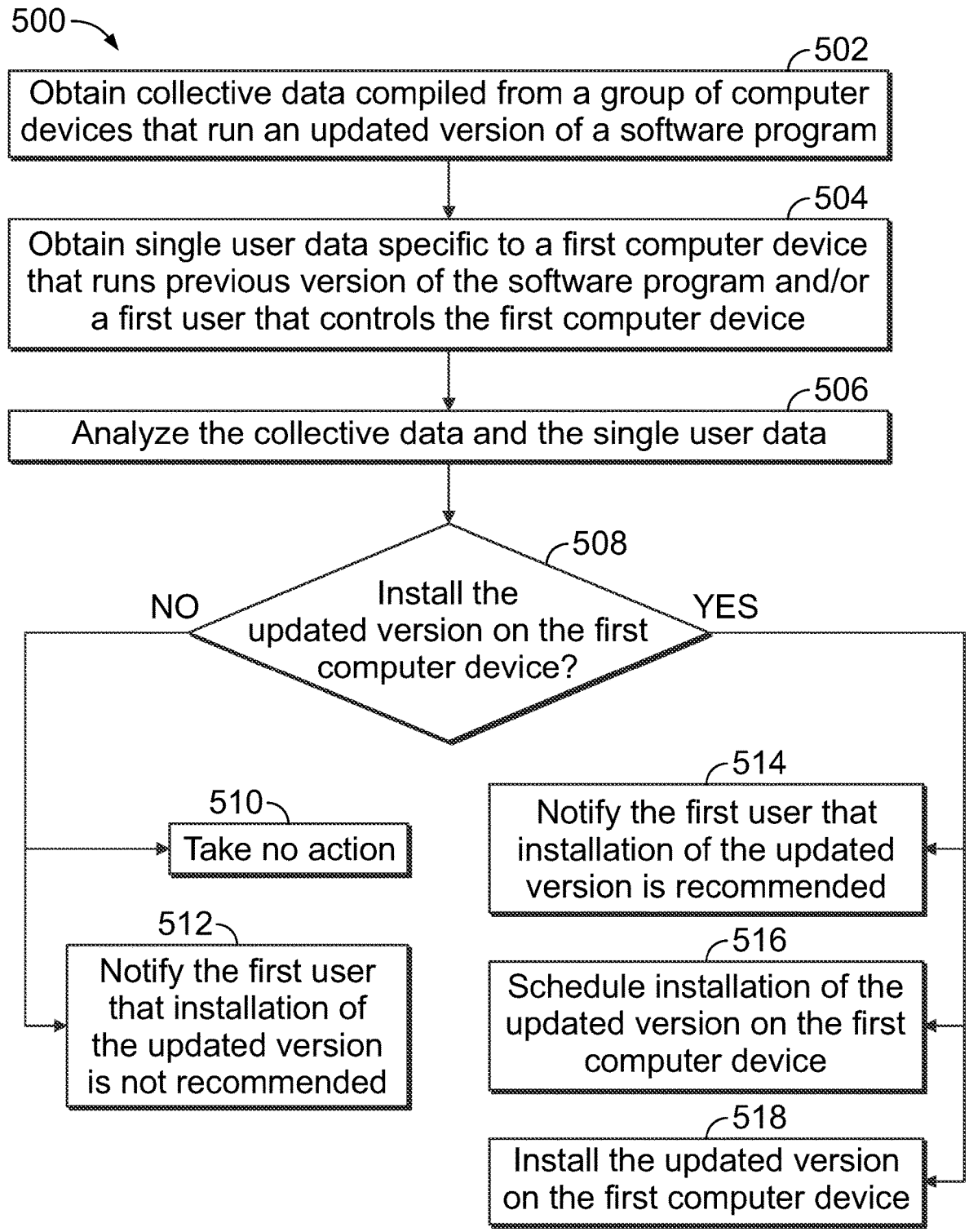
FIG. 5. is a flow chart of a method of managing updates for a first computer device according to an embodiment.

FIG. 5 is a flow chart 500 of a method of managing updates for a first computer device according to an embodiment. The method may be performed by the update controller 102, such as the one or more processors 112 thereof. Some aspects of the method may be performed by the ANN 134 or another computer-based model that is discrete from the one or more processors 112 of the update controller 102. The method optionally may include at least one additional step than shown, at least one fewer step than shown, and/or at least one different step than shown.

At step 502, the one or more processors of the update controller obtain collective data compiled from a group of computer devices that run an updated version of a software program. The collective data includes usage data of the computer devices in the group and/or user feedback directed to the updated version of the software program and provided by users that control at least some of the computer devices in the group.

At step 504, the one or more processors of the update controller obtain single user data that is specific to the first user. The single user data includes user preference settings selected by the first user and/or usage data of a first computer device while operating a previous version of the software program. The first computer device is controlled by the first user, such as owned, rented, and/or operated by the first user.

At step 506, the collective data and the single user data is analyzed. In an embodiment, the analysis may include assigning point values to different elements of the collective data, and assigning point values to different elements of the single user data. The update controller may compile or aggregate the point values to produce a score associated with the updated version of the software program.

At step 508, a determination is made whether or not the updated version of the software program should be installed on the first computer device. The determination is based on the analysis at step 506. In an embodiment, the determination is made by comparing the score that is compiled to one or more designated ranges and/or threshold values. For example, if the score is within a first designated range, then the update controller determines that the first computer device should indeed install the updated version. Conversely, if the score is within a second designated range, then the update controller determines that the first computer device should not install the updated version.

Referring now back to step 506, in another embodiment the analysis may include inputting the collective data into an artificial neural network trained to generate, as an output, a recommendation as to whether or not the updated version of the software program should be installed on the first computer device. The determining step 508 is based on the recommendation of the artificial neural network. For example, the update controller may adopt the recommendation of the artificial neural network and/or may make a recommendation based on the output of the artificial neural network.

If it is determined that the updated version of the software program should not be installed on the first computer device, then flow proceeds to either step 510 or step 512. At step 510, no follow-up action is taken by the update controller. At step 512, the update controller notifies the first user that installation of the updated version is not recommended. The one or more processors of the update controller may generate a control signal that communicates a message to a user communication device possessed by the first user. The user communication device may then display a notification for the first user on a display screen based on receipt of the message.

On the other hand, if it is determined that the updated version of the software program should be installed on the first computer device at step 508, then flow proceeds to at least one of step 514, step 516, or step 518. At step 514, the update controller notifies the first user that installation of the updated version on the first computer device is recommended. The notification may also prompt the first user to either select immediate installation of the updated version or to schedule installation of the updated version. At step 516, the update controller schedules installation of the updated version on the first computer device. At step 518, the update controller installs the updated version on the first computer device. The update controller may take a combination of the actions in steps 514, 516, and 518. For example, the update controller may first notify the first user at step 514. The controller may schedule installation of the updated version according to step 516 at a specific time in the future if the first user does not select a specific time in response to the notification. At the scheduled time, the controller may automatically install the updated version on the first computer device according to step 518.

The update management system and method described herein draws insight from external sources to inform the automated decision-making of whether or not to recommend that a computer device install a software update, which may result in more efficient and effective software updates than known update practices.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An update management system comprising:
   a memory configured to store program instructions; and
   one or more processors operably connected to the memory, wherein the program instructions are executable by the one or more processors to:
   obtain collective data compiled from a group of computer devices that run an updated version of a software program, the collective data including usage data of the computer devices in the group and user feedback directed to operation of the updated version of the software program, the user feedback including at least one of ratings or reviews of the updated version provided by users that control at least some of the computer devices in the group;
   determine, based at least on an analysis of the collective data, to install the updated version of the software program on a first computer device that operates a previous version of the software program; and
   generate a control signal to automatically install the updated version on the first computer device based on the determination to install the updated version on the first computer device.

2. The update management system of claim 1, wherein the one or more processors obtain at least some of the user feedback from posts generated and submitted by the users via a network.

3. The update management system of claim 1, wherein the usage data of the collective data includes one or more of performance parameters of the computer devices that run the updated version of the software program, failure events of the computer devices that run the updated version, or penetration data indicative of a prevalence of the updated version of the software program within a community of computer devices broader than the group.

4. The update management system of claim 1, wherein the software program includes firmware, and the first computer device and at least some of the computer devices in the group are servers.

5. The update management system of claim 1, wherein the one or more processors further execute the program instructions to obtain single user data that is specific to a first user that controls the first computer device, the one or more processors configured to determine to install the updated version of the software program on the first computer device based on both the analysis of the collective data and an analysis of the single user data.

6. The update management system of claim 5, wherein the single user data comprises at least one of user preference settings selected by the first user or usage data of the first computer device while operating the previous version of the software program.

7. The update management system of claim 1, wherein the one or more processors further execute the program instructions to analyze the collective data by assigning point values to different elements of the collective data and compiling the point values to produce a score associated with the updated version of the software program, wherein the one or more processors determine to install the updated version of the software program on the first computer device based on the score.

8. The update management system of claim 7, wherein the one or more processors are configured to determine to install the updated version of the software program on the first computer device in response to the score being within a first designated range, and atoll determine not to install the updated version of the software program on the first computer device in response to the score being within a second designated range that is discrete from the first designated range.

9. The update management system of claim 8, wherein the one or more processors are configured to determine to install the updated version of the software program on the first computer device within a first period of time in response to the score being within a first portion of the first designated range, and to install the updated version of the software program on the first computer device within a different, second period of time in response to the score being within a second portion of the first designated range.

10. The update management system of claim 1, wherein the one or more processors further execute the program instructions to analyze the collective data by inputting the collective data into an artificial neural network trained to generate, as an output, a recommendation whether or not to install the updated version of the software program on the first computer device.

11. The update management system of claim 1, wherein the one or more processors are configured to generate the control signal to automatically install the updated version of the software program on the first computer device one of (i) immediately or (ii) at a designated future time.

12. The update management system of claim 1, wherein the one or more processors are configured to obtain the user feedback including the at least one of ratings or reviews by generating a graphical user interface for display on the computer devices in the group, the graphical user interface prompting the corresponding users that control the computer devices in the group to submit independent observations of the respective users regarding the operation of the updated version of the software program.

13. A method comprising:
    obtaining, via one or more processors, collective data compiled from a group of computer devices that run an updated version of a software program, the collective data including usage data of the computer devices in the group and user feedback directed to operation of the updated version of the software program, the user feedback including at least one of ratings or reviews of the updated version provided by users that control at least some of the computer devices in the group;
    determining, based at least on an analysis of the collective data, to install the updated version of the software program on a first computer device that operates a previous version of the software program; and
    generating a control signal to automatically install the updated version on the first computer device based on determining to install the updated version on the first computer device.

14. The method of claim 13, further comprising obtaining single user data that is specific to a first user that controls the first computer device, the single user data comprising at least one of user preference settings selected by the first user or usage data of the first computer device while operating the previous version of the software program, wherein determining to install the updated version of the software program on the first computer device is based on both the analysis of the collective data and an analysis of the single user data.

15. The method of claim 13, further comprising analyzing the collective data by inputting the collective data into an artificial neural network trained to generate, as an output, a recommendation as to whether or not to install the updated version of the software program on the first computer device, wherein the determining step is based on the recommendation of the artificial neural network.

16. The method of claim 13, further comprising:
assigning point values to different elements of the collective data; and
compiling the point values to produce a score associated with the updated version of the software program, wherein the determining step is based on a comparison of the score to one or more designated ranges.

17. The method of claim 13, wherein the at least one of ratings or reviews of the updated version of the software program are independently generated and submitted by a plurality of the users that control at least some of the computer devices in the group, each rating or review of the user feedback being based on an observation of the operation of the updated version by the respective user that generates the rating or review.

18. A computer program product comprising a non-transitory computer readable storage medium, the non-transitory computer readable storage medium comprising computer executable code configured to be executed by one or more processors to:

obtain collective data compiled from a group of computer devices that run an updated version of a software program, the collective data including usage data of the computer devices in the group and user feedback directed to operation of the updated version of the software program, the user feedback including at least one of ratings or reviews of the updated version provided by users that control at least some of the computer devices in the group;
determine, based at least on an analysis of the collective data, to install the updated version of the software program on a first computer device that operates a previous version of the software program; and
generate a control signal to automatically install the updated version on the first computer device based on the determination to install the updated version on the first computer device.

19. The program product of claim 18, wherein the computer executable code is further configured to be executed by the one or more processors to obtain single user data that is specific to a first user that controls the first computer device, the one or more processors configured to determine to install the updated version of the software program on the first computer device based on both the analysis of the collective data and an analysis of the single user data.

20. The program product of claim 18, wherein the computer executable code is further configured to be executed by the one or more processors to analyze the collective data by assigning values to different elements of the collective data and compiling the values to produce a score associated with the updated version of the software program, wherein the one or more processors determine to install the updated version of the software program on the first computer device based on the score.

* * * * *